Aug. 9, 1955
P. GONNELLA
2,714,912
TRAILER HITCH PROTECTOR
Filed Aug. 21, 1952
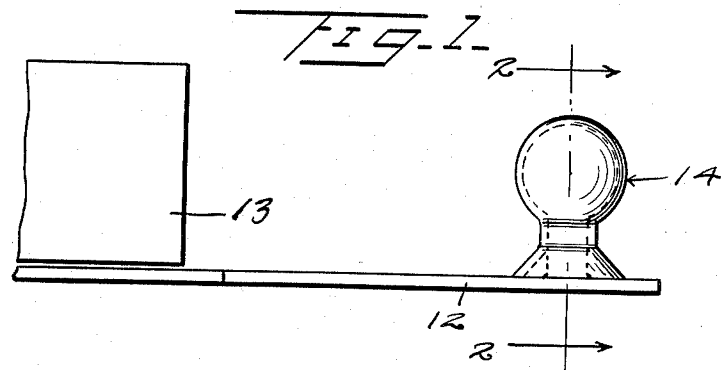
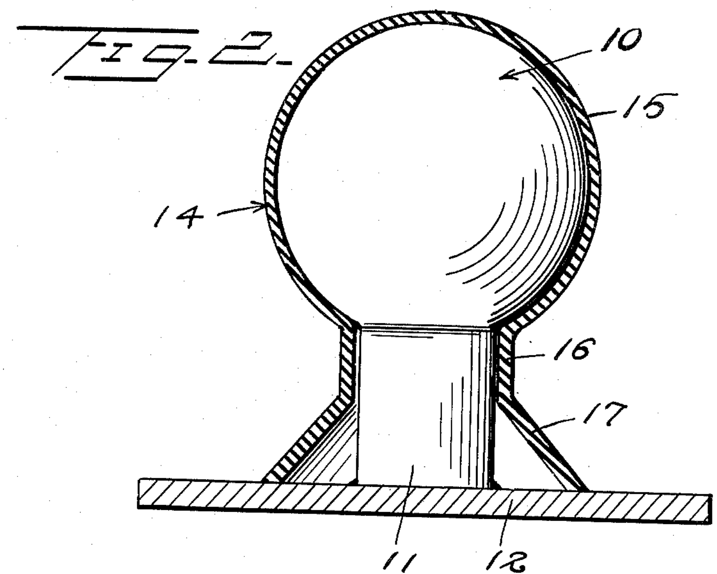
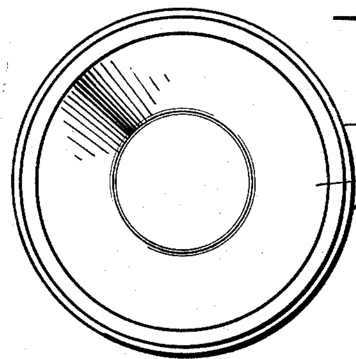
INVENTOR
Peter Gonnella
BY Kimmel & Crowell
ATTORNEYS

United States Patent Office 2,714,912

Patented Aug. 9, 1955

1

2,714,912

TRAILER HITCH PROTECTOR

Peter Gonnella, Ionia, Mich.

Application August 21, 1952, Serial No. 305,564

1 Claim. (Cl. 150—52)

This invention relates to a protector or cover for one element of a trailer hitch.

In trailer hitches, particularly of the type which are used with passenger vehicles, a ball-shaped stud is fixed to the tractor vehicle and projects rearwardly therefrom. When the trailer is uncoupled that part of the hitch which is fixed to the tractor vehicle is exposed to the elements and soon becomes rusty. Where the element is coated with grease to protect the same against corrosion, the grease may be rubbed off onto the clothes of a person opening or closing the trunk at the rear of the vehicle.

It is, therefore, an object of this invention to provide a protector or cover for the hitch element which can be applied over the grease coating and can be mounted or removed without the use of tools.

Another object of this invention is to provide a protector or cover which is made out of rubber or other elastic material which will prevent moisture from getting into contact with the hitch element.

With the above and other objects in view, my invention consists in the arrangement, combination and details of construction disclosed in the drawing and specification, and then more particularly pointed out in the appended claim.

In the drawings—

Figure 1 is a detailed side elevation of a hitch element attached to a tractor vehicle having a protective covering mounted thereon, constructed according to an embodiment of this invention, Figure 2 is a sectional view taken on the line 2—2 of Figure 1, Figure 3 is a bottom plan view of the protector.

Referring to the drawing, the numeral 10 designates generally a tractor hitch element which is of spherical configuration and extends upwardly from a cylindrical neck or stud 11. The neck or stud 11 is carried by a supporting plate 12 which extends rearwardly from the tractor vehicle 13. It will be understood that the supporting plate 12 may be clamped or otherwise secured to any portion of the rear of the tractor vehicle, such as the frame, rear bumper, or the like.

2

In order to provide a means whereby the spherical pivot member forming the male hitch element will be protected against corrosion when the hitch elements are disconnected, I have provided a flexible covering member generally indicated at 14. The covering member 14 is preferably formed out of rubber and is formed with a spherical cap 15 yieldably engaging about the spherical member 10. The cap 15 has extending downwardly therefrom a cylindrical neck 16 which engages about the stud 11 and the cylindrical neck 16 terminates in a flared skirt 17 which extends downwardly to substantially contact with the supporting plate 12.

In practice the covering member 14 is preferably formed out of rubber or other suitable yieldable material which may stretch when being applied so that the covering will snugly engage about the male hitch element. In applying the covering the skirt 17 and the cylindrical neck 16 are stretched over the spherical member 10 so that the cap 15 will snugly and closely engage about the spherical member 10, with the neck 16 and the skirt 17 disposed below the spherical member 10.

This covering will prevent any grease from being wiped off of the spherical member 10 by the clothes of a person opening the rear trunk of the vehicle, or otherwise brushing against the spherical member 10, and will also retain the grease or lubricant on the spherical member 10 so that this member will not corrode from moisture or the like.

I do not mean to confine myself to the exact details of construction herein disclosed, but claim all variations falling within the purview of the appended claim.

What I claim is:

A protective cover for a hitch element mounted on a support plate and comprising a substantially spherical member rigidly connected to one end of a cylindrical stud having its other end connected to said plate, said protective cover comprising a substantially hollow spherical body formed of resilient material and provided with a laterally extending cylindrical neck, and said neck terminating in an enlarged outwardly flared radial flange, said spherical body and said cylindrical neck being adapted to snugly encase said spherical member and a portion of said stud, and said flange having its outer end in sealing engagement with said support plate.

References Cited in the file of this patent

UNITED STATES PATENTS

| | | |
|---|---|---|
| 1,556,966 | Selig | Oct. 13, 1925 |
| 1,668,716 | Herdman et al. | May 8, 1928 |
| 2,131,067 | Paden | Sept. 27, 1938 |
| 2,430,441 | Abramson | Nov. 11, 1947 |